C. E. AKELEY.
PANORAMA DEVICE FOR MOTION PICTURE CAMERAS.
APPLICATION FILED APR. 10, 1915.
1,159,734.
Patented Nov. 9, 1915.
3 SHEETS—SHEET 3.
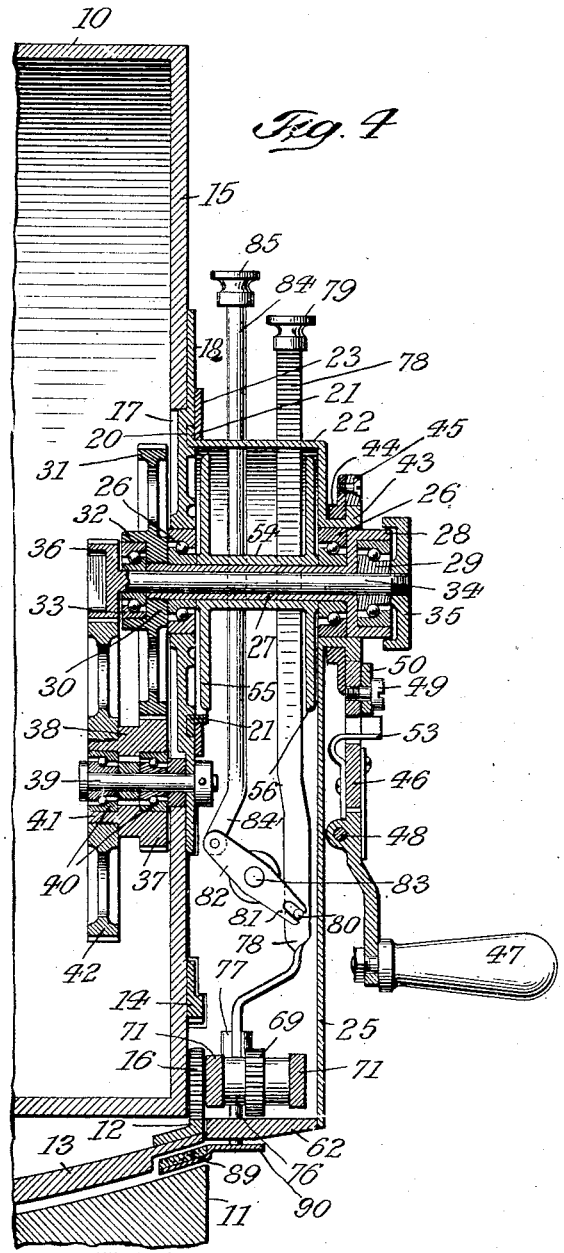
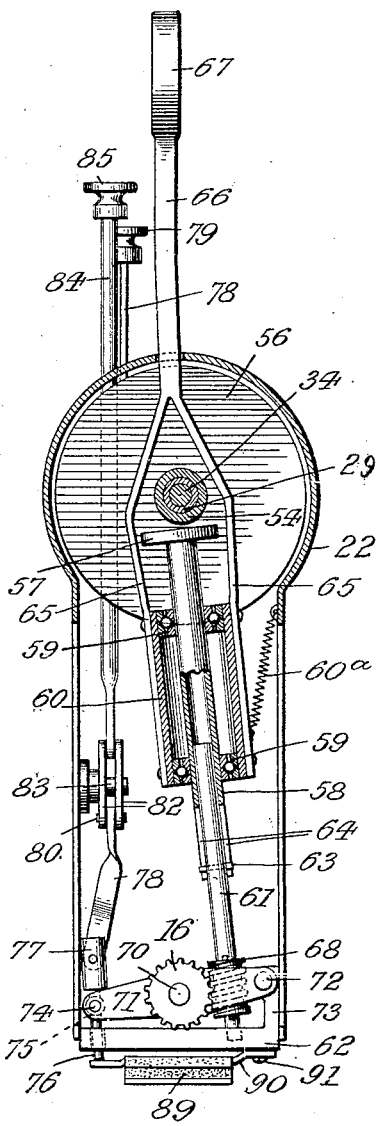
WITNESS
INVENTOR
Carl E. Akeley
BY
ATTORNEY

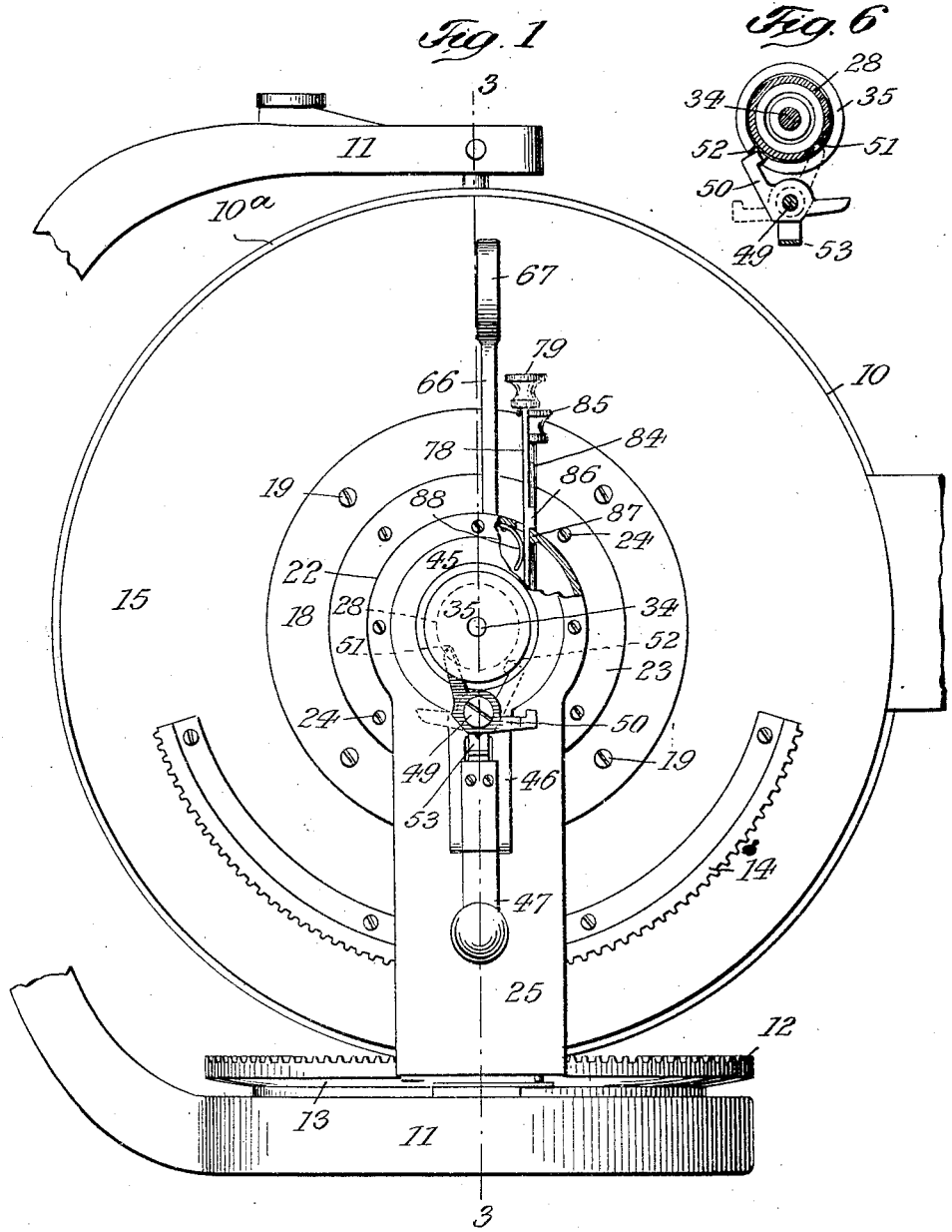

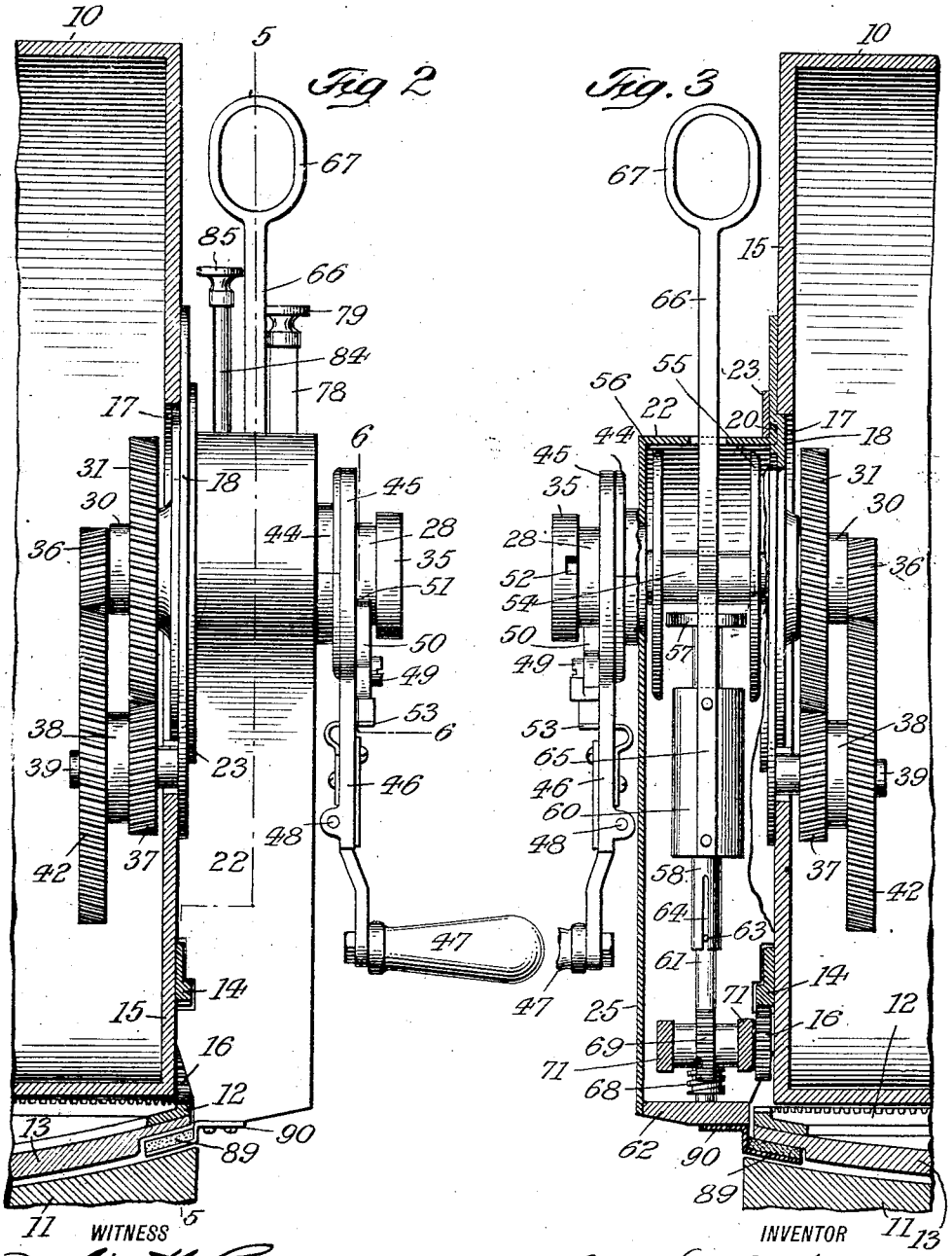

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

PANORAMA DEVICE FOR MOTION-PICTURE CAMERAS.

1,159,734. Specification of Letters Patent. Patented Nov. 9, 1915.

Application filed April 10, 1915. Serial No. 20,410.

*To all whom it may concern:*

Be it known, that I, CARL E. AKELEY, a citizen of the United States, and a resident of New York city, county and State of New York, have invented new and useful Improvements in Panorama Devices for Motion-Picture Cameras, of which the following is a specification.

This invention relates to a novel mechanism for swinging a motion picture camera either in a horizontal direction or in a vertical direction in order to adapt said camera for taking corresponding panoramic pictures.

My device is so constructed that a change from the horizontal movement to the vertical movement and vice versa may be readily effected while at the same time the direction of rotation of the camera and the speed at which such rotation takes place, may be adjusted in a reliable and convenient manner.

In the accompanying drawing, Figure 1 is a side view partly in section and partly broken away of a motion picture camera provided with my novel panorama device; Fig. 2 a left hand side view partly in section thereof; Fig. 3 a vertical central cross section on line 3—3, Fig. 1 looking toward the left; Fig. 4 a similar section on line 3—3, Fig. 1, looking toward the right, with some of the parts omitted; Fig. 5 a vertical section on line 5—5, Fig. 2, and Fig. 6 a cross section on line 6—6, Fig. 2.

The numeral 10 indicates a motion picture camera shown to be of cylindrical shape and to rotatably engage an annular member 10ª that in turn rotatably engages at its top and bottom, a head 11 forming part of a camera stand. The camera and the stand are thus connected in such a manner that although both of these parts are firmly united the camera may be rotated either in a horizontal or in a vertical direction, such connection not forming part of the present invention and being for instance more fully shown and described in a copending patent application filed by me August 3rd, 1914, under Serial Number 854,777. In order to produce the desired horizontal movement, a toothed rim 12 is attached to a dished member 13 adapted to be firmly clamped to head 11 by any suitable means (not shown), while for producing the vertical movement, a toothed sector 14 is attached to one of the end plates 15 of the camera 10. Intermediate the rim 12 and sector 14, there is arranged a driving pinion or member 16 the diameter of which is less than the distance between said rim and sector so that the pinion may be in mesh with only one of said parts at the time. Means are provided for reciprocating the pinion 16 so as to either come into engagement with the rim or with the sector and for reversing the direction of rotation of the driving pinion so that any desired movement may be imparted to the camera, said means being as follows:—End plate 15 of camera 10 is provided with a central opening 17 which is closed by a disk 18 held in position by screws 19. Disk 18 is provided with an outer annular groove 20 into which is rotatably fitted the circular flange 21 of a casing 22 said flange being confined within the groove by a ring 23 attached to disk 18 by screws 24. The disk 18 and the outer wall 25 of casing 22 are provided with alined openings into each of which is tightly fitted the outer stationary member of a conventional annular ball bearing 26. The inner rotary member of each bearing 26 is firmly attached to a sleeve 27 having an outer cup-shaped head 28 accommodating an annular ball bearing 29. The inner end of sleeve 27 is threaded for the reception of the likewise threaded hub 30 of a gear wheel 31, which hub is recessed as at 32 for the reception of an annular ball bearing 33. Bearings 29, 33 support a spindle 34 that extends loosely through the central bore of sleeve 27. On the outer end of spindle 34 is screwed a flanged disk 35 while the inner end of said spindle is provided with a cup-shaped pinion 36 to which the movable inner mechanism of the motion picture camera (not shown) may be connected. Toothed wheel 31 meshes into a pinion 37 having a hub 38 that turns loosely on a fixed stud 39 of disk 18, ball bearings 40 being interposed between said hub and stud. On the threaded end 41 of hub 38 is screwed a gear wheel 42 that engages the pinion 36.

Casing 22 is provided with an outwardly protruding flange 43 carrying a freely rotatable ring 44 to which is attached the eye 45 of a crank lever 46 provided with a handle 47, the latter being preferably pivoted to lever 46 as at 48 for facilitating packing and shipping. Upon lever 46 is oscillatably mounted by a screw 49, a dog 50 having two shanks one of which is adapted to engage a notch 51 of cup 28 while the other shank is adapted to engage a notch 52 of disk 35. Dog 50 is engaged by a spring 53 attached to lever 46 and adapted to keep either one of the shanks in engagement with its notch.

Within casing 22, there is firmly attached to sleeve 27, a hub 54 carrying two spaced friction disks, 55, 56, either one of which is adapted to be engaged by a friction roller 57, the diameter of said roller being slightly less than the distance between the friction disks. Roller 57 is provided with a hollow stem 58, rotatably mounted in ball bearings 59 of a cylindrical shell 60. The axial bore of stem 58 is slidably engaged by a spindle 61 stepped into a corresponding socket of the bottom plate 62 of casing 22 and provided with a transversely extending pin 63 that engages slots 64 of stem 58. Shell 60 is secured to the bifurcated lower end 65 of an upwardly extending bar 66 terminating in a finger piece 67. It will be seen that by a slight movement of finger piece 67 to the left or right (Fig. 3), the roller 57 will be brought into frictional contact with either the inner disk 55 or the outer disk 56, thereby rotating spindle 61 in any direction desired, while a downward or upward movement of the finger piece 67 will either increase or decrease the rotary speed of said spindle, a spring 60$^a$ tending to maintain the shell 60 and roller 57 in their raised position.

Near its lower end there is slidably, but non-rotatably mounted upon the spindle 61 a worm 68 which meshes into a worm wheel 69 fast on an axle 70 that also carries the driving pinion 16. Axle 70 is journaled in a pair of arms 71 fulcrumed at 72 to an extension 73 of the bottom plate 63 of casing 22. The free ends of arms 71 are connected by a transverse pin 74 that is engaged by the eye 75 of a bolt 76 guided in a corresponding opening of plate 62. To the slotted head 77 of bolt 76 is pivoted a bent substantially upright bar 78 projecting outward through a corresponding opening provided in the top of casing 22 and carrying a knob 79. Bar 78 is provided with a cross pin 80 that engages the forked end 81 of a double lever 82 pivoted at 83. To the other end of lever 82 is fulcrumed a rod 84 also projecting outward through an opening provided in the top of casing 22 and carrying a knob 85.

As thus far described it will be seen that in the position of the parts shown in Figs. 1 and 2 the camera mechanism is driven at high speed when handle 47 is rotated, while a horizontal panorama picture is being taken. Owing to the engagement of the dog 50 with the notch 51 of cup 28, rotary motion is directly transmitted from the handle 47 to the sleeve 27 and consequently to the friction disks 55, 56 through said dog and cup, while the speed gear 31, 37, 42, 36 runs idle as far as the present invention is concerned. In the position of the dog 50 illustrated in Fig. 6 said dog is in engagement with the notch 52 of disk 35 in which case the rotary motion of handle 47 will be transmitted through dog 50 and disk 35 to the spindle 34, and thence through pinion 36, gear wheel 42, pinion 37 and gear wheel 31 to sleeve 27 so that the friction disks, 55, 56 will be rotated at a comparatively low speed.

In the position of the parts illustrated in Figs. 2, 4 and 5, pinion 16 is lowered into engagement with the circular rack 12 so as to adapt the camera for the production of a horizontal panoramic view. As soon as the bar 66 is slightly tilted toward the right or left (Fig. 3), by means of finger piece 67, the friction roller 57 will be brought into frictional engagement either with disk 55 or with disk 56. In this way, rotary movement in one or the other direction will be imparted to worm 68, which motion is transmitted through worm wheel 69 and axle 70 to the pinion 16 so that the camera 10 will be revolved about its vertical axis. The rotary speed of the camera may be readily increased by depressing finger piece 67 against the action of spring 60$^a$, while upon relieving said pressure, the spring 60$^a$ will raise shell 60 together with roller 57 so as to cause a corresponding reduction of speed.

If it is desired to produce an upright panoramic picture, knob 85 is depressed which movement is transmitted to the bar 78 through lever 82, thus effecting an upward movement of said bar. As the latter is, by bolt 76 connected to arms 71, these arms will also be swung upward thereby causing pinion 16 to clear rack 12 and to engage sector 14 (Fig. 3). Finger piece 67 is now operated in the same manner as above described for regulating the direction of rotation as well as the rotary speed of the camera. It will thus be seen that only one of the knobs 79, 85 may occupy its raised position at the time, while upon depressing said temporarily raised knob, the other knob will be automatically lifted to its elevated position. In order to lock the knobs in the position to which they have been set, the bar 78 is shown to be provided with a lateral nose 86 adapted to engage either above or below an abutment 87 of casing 22, a spring 88 tending to hold said nose and abutment in engagement. Whenever the horizontal panorama is to be changed to a vertical panorama or vice versa, a slight lateral pressure on knob 79 will unlock the nose 86 from abutment 87 to permit a free movement of bar 78.

In order to prevent the camera 10 from being accidentally rotated on its vertical axis while an upright panoramic picture is taken, a brake shoe 89 is provided that temporarily clamps casing 22 to the member 13 supported by head 11. This shoe is carried by a spring 90 fastened as at 91 to the bottom plate 62 of casing 22 and is engaged at its free end by the protruding foot of the bolt 76. Thus whenever a horizontal panoramic view is taken, bolt 76 is depressed thereby raising shoe 89 off member 13 (Fig. 4) and permitting a free horizontal movement of camera 10, while in case an upright panoramic picture is taken, the camera is automatically locked to member 13. It will thus be seen that the finger piece 67 as well as the knobs 79, 85 may be readily controlled by the fingers of one and the same hand without changing the general position of the latter, thereby permitting the camera to be quickly adapted to any kind of panoramic view to be taken without requiring any previous adjustment and setting as was the case with the cameras heretofore generally used. By properly manipulating the knobs 79, 85 a horizontal panoramic adjustment may be readily changed to a vertical adjustment and vice versa while by manipulating the finger piece 67, the direction of rotation and the speed at which such rotation of the camera takes place may be adapted to prevailing conditions in a quick and reliable manner.

I claim:

1. A device of the character described comprising means for rotatably supporting a camera, a normally fixed first toothed member, a second toothed member fast on he camera, a pinion adapted to engage ither on° of said members, and means for rotating said pinion.

2. A device of the character described comprising means for rotatably supporting a camera, a normally fixed first toothed member, a second toothed member fast on the camera, a pinion adapted to engage either one of said members, means for rotating said pinion, and means for controlling the rotary speed thereof.

3. A device of the character described comprising means for rotatably supporting a camera, a normally fixed first toothed member, a second toothed member fast on the camera, a pinion adapted to engage either one of said members, and manually operable means for rotating said pinion at a variable speed.

4. A device of the character described comprising means for rotatably supporting a camera, a normally fixed first toothed member, a second toothed member fast on the camera, a pinion adapted to engage either one of said members, means for imparting rotary motion to said pinion, and manually operable means for varying the speed and direction of rotation of the pinion.

5. A device of the character described comprising means for rotatably supporting a camera, a normally fixed first toothed member, a second toothed member fast on the camera, a pinion adapted to engage either one of said members, a pair of opposed rotary friction disks, a friction roller adapted to engage either of said disks, and means for operatively connecting said roller to the pinion.

6. A device of the character described comprising means for rotatably supporting a camera, a normally fixed first toothed member, a second toothed member fast on the camera, a pinion adapted to engage either one of said members, a pair of opposed rotary friction disks, a friction roller adapted to engage either of said disks, means for operatively connecting said roller to the pinion, and means for radially displacing the friction roller relatively to the friction disks.

7. A device of the character described comprising means for rotatably supporting a camera, a normally fixed first toothed member, a second toothed member fast on the camera, a pinion adapted to engage either one of said members, a pair of opposed rotary friction disks, a friction roller the diameter of which is less than the distance between the friction disks, means for deflecting the roller toward one or the other of said disks, and for radially displacing the friction roller relatively to the friction disks, and means for operatively connecting said roller to the pinion.

8. A device of the character described comprising means for rotatably supporting a camera, a normally fixed first toothed member, a second toothed member fast on the camera, a pinion adapted to engage either one of said members, a pair of opposed rotary friction disks, a friction roller the diameter of which is less than the distance between the friction disks, a hollow stem carrying said roller, a spindle telescoped by said stem and non-rotatably connected thereto, a worm on said spindle, a worm wheel engaging said worm and connected to the pinion, and means for deflecting the friction roller toward one or the other of the friction disks and for radially displacing said roller relatively to said disks.

9. A device of the character described comprising means for rotatably supporting a camera, a normally fixed first toothed member, a second toothed member fast on the camera, a pinion, an arm rotatably supporting said pinion, and manually operable means for tilting said arm to bring said pinion into operative engagement with either of the toothed members.

10. A device of the character described comprising means for rotatably supporting a camera, a normally fixed first toothed member, a second toothed member fast on the camera, a pinion, an arm rotatably supporting said pinion, means for rotating said pinion, manually operable means for controlling the rotary speed of the pinion, and manually operable means for tilting the arm thereby bringing said pinion into operative engagement with either of the toothed members.

11. A device of the character described comprising means for rotatably supporting a camera, a normally fixed first toothed member, a second toothed member fast on the camera, a pinion, an arm rotatably supporting said pinion, means for rotating said pinion, manually operable means for controlling the rotary speed and the direction of rotation of the pinion, and manually operable means for tilting the arm thereby bringing said pinion into operative engagement with either of the toothed members.

12. A device of the character described comprising means for rotatably supporting a camera, a normally fixed first toothed member, a second toothed member fast on the camera, a pinion adapted to engage either one of said members, an arm carrying said pinion, a pair of intercoupled knobs adapted to oscillate said arm, and means for rotating the pinion.

13. A device of the character described comprising means for rotatably supporting a camera, a normally fixed first toothed member, a second toothed member fast on the camera, a pinion adapted to engage either one of said members, an arm carrying said pinion, a pair of intercoupled knobs adapted to oscillate said arm, a brake for the camera and adapted to be actuated by said knobs, and means for rotating the pinion.

14. A device of the character described comprising means for rotatably supporting a camera, a normally fixed first toothed member, a second toothed member fast on the camera, a pinion, means for rotating said pinion, a finger piece adapted to control the rotary speed and the direction of rotation of said pinion, a pair of intercoupled knobs located in proximity to said finger piece whereby said knobs and finger piece may be simultaneously operated by the fingers of one hand of the operator, and means controlled by the knobs for bringing the pinion into engagement with either of the toothed members.

15. A device of the character described comprising means for rotatably supporting a camera, a normally fixed first toothed member, a second toothed member fast on the camera, a pinion adapted to engage either one of said members, and means for rotating said pinion, said means including a variable speed gear.

16. A device of the character described comprising means for rotatably supporting a camera, a normally fixed first toothed member, a second toothed member fast on the camera, a pinion adapted to engage either one of said members, a rotary spindle, a notched disk fast on said spindle, a sleeve inclosing the spindle and having a notched head, a variable speed gear intermediate said spindle and sleeve, a crank lever, a dog pivoted to said lever and adapted to engage either of said disk and head, and means for operatively connecting said sleeve to the pinion.

17. A device of the character described, comprising a camera rotatable about a substantially vertical axis and about a substantially horizontal axis, a rotatable driving member, and means coöperating with said member for rotating the camera about either of its axes.

18. A device of the character described comprising a support, a camera, means for connecting the camera to said support, said connecting means permitting the camera to be rotated about a substantially vertical axis and about a substantially horizontal axis, first engaging means on the support, second engaging means on the camera, a rotatable driving member, and means for bringing said member into operative relation with either of said first and second engaging means.

19. A device of the character described comprising a support, a camera, means for connecting the camera to said support, said connecting means permitting the camera to be rotated about a substantially vertical axis and about a substantially horizontal axis, a manually operable rotatable driving member, first member engaging means on the support, second member engaging means on the camera, and manually operable means for bringing said member into operative relation with either of said first and second member engaging means.

20. A device of the character described comprising a support, a camera, means for connecting the camera to said support, said connecting means permitting the camera to be rotated about a substantially vertical axis and about a substantially horizontal axis, a driving member, means for rotating said driving member, manually operable means for controlling the rotary speed and the direction of rotation of said member, first member engaging means on the support, second member engaging means on the camera, and manually operable means for bringing the driving member into operative relation with either of said first and second member engaging means.

CARL E. AKELEY.